United States Patent [19]
Proud et al.

[11] Patent Number: 5,467,968
[45] Date of Patent: Nov. 21, 1995

[54] TRANSMISSION LINE INSTALLATION

[75] Inventors: Nicholas W. Proud, Needham Market; Robert A. Freeman, Ipswich, both of England

[73] Assignee: British Telecommunications public limited company, London, England

[21] Appl. No.: 723

[22] Filed: Jan. 5, 1993

Related U.S. Application Data

[62] Division of Ser. No. 603,711, Nov. 21, 1990, Pat. No. 5,199,689.

[30] Foreign Application Priority Data

Jun. 2, 1988 [GB] United Kingdom ............... 8813068

[51] Int. Cl.$^6$ ........................................ B66F 3/24
[52] U.S. Cl. ........................................ 254/134.4
[58] Field of Search ............... 254/1, 134.4, 134.3 FT, 254/134.3 R; 15/109.06 R; 268/25, 43, 178

[56] References Cited

U.S. PATENT DOCUMENTS 4,691,896  9/1987  Reeve et al. .

FOREIGN PATENT DOCUMENTS 37076    5/1968  Australia .
2212941  8/1989  United Kingdom .

Primary Examiner—Robert C. Watson
Attorney, Agent, or Firm—Nixon & Vanderhye

[57] ABSTRACT

An apparatus for installing optical fibres (11) in tubes or ducts (29). An optical fibre is fed from a reel (13) into a small diameter feed portion of duct (25), and compressed air is introduced into the duct. This advances the fibre, using viscous drag forces, into a main duct of larger diameter. There is a pressure drop at the intersection of the two ducts. Subsequently, the advancement of the fibre is continued by maintaining the air supply, and the viscous drag forces, acting on the increasing length of the fibre in the duct, advance it along the duct. Two or more fibres, which may be unsheathed primary coated fibres, may be installed simultaneously.

6 Claims, 1 Drawing Sheet

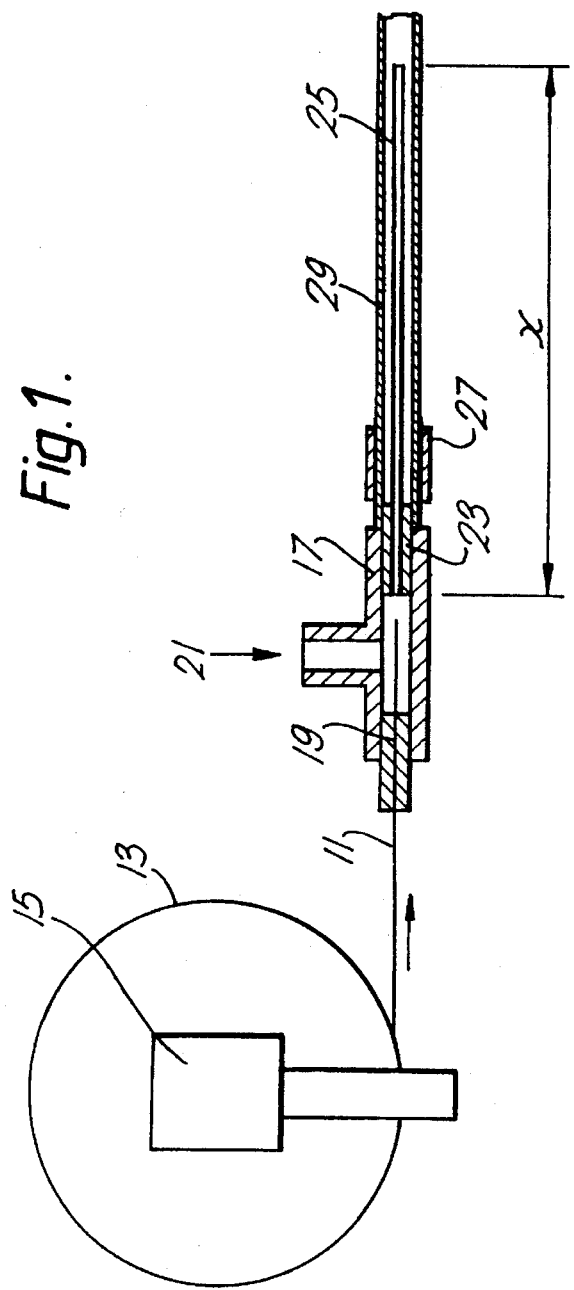
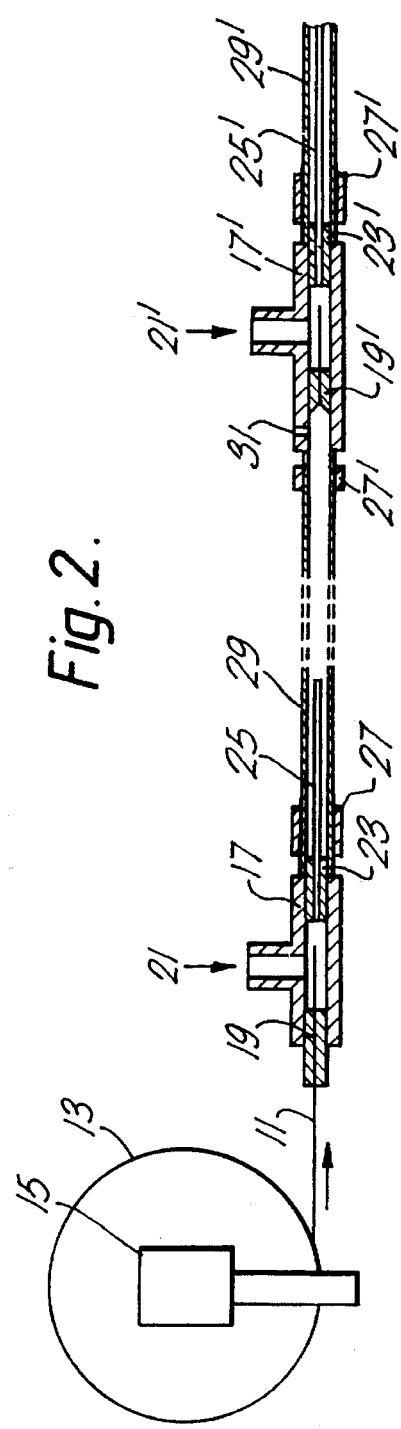

TRANSMISSION LINE INSTALLATION

This is a division of application Ser. No. 07/603,711, filed Nov. 21, 1990 now U.S. Pat. No. 5,199,689

FIELD OF THE INVENTION

The present invention relates to a method and apparatus for installing transmission lines in ducts or tubes.

BACKGROUND OF THE INVENTION

European Patent No. 108590 discloses a method and apparatus for installing optical fibre members within tubular ducts using fluid drag of a gaseous medium to propel the fibre member along the duct. In the illustrated examples in that patent, a fibre bundle is introduced to the duct via a feed head and wheels, in order to urge the bundle into the duct against a resistive force acting on the advancing end of the bundle.

A number of other methods of introducing fibres into ducts, for subsequent advancement along the ducts with the aid of viscous drag forces, have since been described.

One particular such method comprises introducing a fibre member to a duct at a point near a high local flow of compressed air, and bleeding some of the air through a vent some distance, typically around 1 meter, downstream. This method is fully described in our European Patent Application 0287225A1.

In all practical applications of the fibre blowing process, the nature of the fibre bundle to be installed has been an important factor. The present applicants and others working on the process have investigated a variety of different bundles, in an attempt to develop an optimum range of products. One product which has particularly good characteristics is described in our European Patent Application No. 0157610. One of the examples in that application is a seven-fibre bundle with a tight skin around the fibres, and an outer sheath of foamed material. The characteristics of this bundle are that it is lightweight, given its volume, and its large surface area provides a good surface for the action of fluid drag forces. There is the further advantage that the tight skin, or inner sheath, locks the fibres together, so that the rigidity is increased, and the fibres are unlikely to buckle. Recently, there has been a trend towards using more lightweight bundles with only a small number of fibres or even a single fibre. Generally for practical applications it has been thought important to create a package structure of some kind, usually comprising a foamed layer, to provide a surface area to weight ratio which results in the package being blowable over tortuous routes, which may extend over hundreds of meters. Typically, fibre members have been in the range 1 to 3.5 $gm^{-1}$. Thus, a relatively bulky but light structure was seen as important for good blowing properties. Additionally, protection for the fibres was seen as essential, because any process carried out on fibres is seen as running some risk of damaging the fibres, for example by transmitting excessive tensile or compressive force to the fibres. Thus, robust packaging was used.

As is well known, the provision of a foamed layer in conjunction with optical fibres presents a number of practical difficulties, because shrinkage of the foam can introduce undesirable compressive forces which can adversely affect the transmission properties of the fibres. The above-described locking-effect of seven tightly encased fibres is one way of mitigating this problem. A loose layer of foam is another. Lengthy development has, however, been required to produce a robust product suitable for a wide range of working environments.

SUMMARY OF THE INVENTION

The present invention is a modification of the known fibre blowing process and method which, most surprisingly, gives excellent results. There are also advantages of cheapness and simplicity.

Thus, the present invention provides a method of advancing a transmission line along a duct with viscous drag of a fluid medium, comprising introducing the transmission line to a feed portion of duct, introducing said fluid medium and advancing the line along the portion and into the main duct, which has a larger diameter than the feed portion, and continuing the supply of fluid to the feed portion of duct during the installation of the transmission line.

Most surprisingly no venting is required, as in the above mentioned Application No. 0287225A1. Instead, it is believed that fast flowing fluid in the constricted area of the feed duct acts on the transmission line in the feed portion of duct, applying drag forces, to introduce it to the main duct, and that a pressure drop, or jet effect, occurs as the fluid expands in the larger diameter main duct. This prevents a build-up of frictional resistance which would otherwise restrict the installation distance achievable. The feed duct, or jet effect thereby created, apparently acts, in an analogous manner to the drive wheels in FIG. 7 of EP 0108590, to overcome the so-called hydrostatic force opposing the insertion of the fibre. Further downstream, the lower drag force acting on the leading part of the fibre in the main duct is sufficient to advance the fibre along the duct quite rapidly. It should be noted, however, that the precise mechanism is not fully understood and that the comments above and subsequently on the nature of the process are in no sense to be taken as limiting.

Also very suprisingly, it has been discovered that the process works very well in installing primary coated optical fibre, without any outer coating, sheath, or foam layer. Furthermore, several fibres can be installed simultaneously into a single duct. Lightweight bundles of fibres can also be installed.

The process can accordingly be used in the manufacture of optical fibre cables, in order to introduce fibres into tubes or ducts in the cables without risk of damage to the fibre through handling or any kind of processing. Pristine manufactured fibre is simply unreeled and installed with the aid of compressed air, using the method of the invention, in a tube or duct. The drag force acting on the fibre is too low for this to risk damaging the fibre itself. Thus a low cost and highly effective method of introducing fibres into ducts, tubes or the like is provided.

Another particularly useful application is the installation of single fibres or groups of fibres in ducts in buildings. The ducts themselves may typically be robust, polyethylene material, providing effective protection for the fibres after installation, and no intermediate fibre coating is necessary. It will be appreciated that large cost savings may result. It goes completely contrary to previous practice in the art, which has been always to package fibres in a robust manner before installing them. The packaging, as explained above, has involved much research and development as there are practical difficulties in providing satisfactory packaging, without damaging the fibre during the packaging operation or subsequently, or affecting the operating temperature range.

BRIEF DESCRIPTION OF THE DRAWINGS

The invention will now be described, by way of example, with reference to the accompanying FIGS. 1 and 2 which are schematic views of apparatus according to an embodiment of the invention.

DETAILED DESCRIPTION OF THE DRAWINGS

Referring to FIG. 1, primary coated fibre 11 is stored on a reel 13. The fibre is standard optical fibre, for example a primary coated monomode silica fibre, having a diameter of around 250 μm, and weighting 0.07 g.m$^{-1}$.

Reel 13 is mounted to be driven by a motor 15, which imparts a very small drive force, merely to overcome friction to drive the fibre off the drum and into chamber 17.

Chamber 17 is formed of a standard plastic 'T' piece, having an inlet comprising a hypodermic needle 19 welded into one arm and extending beyond an an air inlet 21 provided in the leg of the 'T'. Fibre 11 enters through needle 19 and is drawn by compressed air supplied at about 10 bar through inlet 21 into feed tube 25 connected with the other arm of chamber 17. The fact that the hypodermic needle 19 extends beyond duct 21 means that the fibre is not deflected by the air supply. Feed tube 25 is a narrow tube of about 0.5 mm internal diameter, and length x about 1 meter. It is attached to connector 23, fixed within the outlet arm of the chamber. An outer duct 29 is also connected to chamber 17 by means of an outer connector 27. Duct 29 has an outside diameter of 5 mm and an internal diameter of 3.5 mm, and may extend for 200 meters or more, along any desired route.

In use, the end of fibre 11 is first fed through needle 19, through chamber 17 and a few centimeters into the feed tube 25. The drive motor and supply of compressed air are both commenced with the air pressure initially at a low level to avoid problems with back pressure tending to push the fibre back out of the feed duct. A small amount of compressed air leaks from chamber 17 via needle 19, and this helps lubricate entry of the fibre. Due to the small diameter of the needle, the volume of air escaping is slight. Most of the air, therefore, travels down feed tube 25 at high velocity, imparting sufficient viscous drag force to propel the fibre along the feed duct and into the main duct 29. Once the fibre has advanced into duct 29, the pressure may be increased as desired, eg to around 10 bar, to adjust speed of advancement of the fibre to the desired level. Duct 29 has 3.5 mm inner diameter (5 mm C.D.), and so on entering duct 29, the compressed air expands rapidly and its pressure is reduced. Both friction and drag forces on the fibre are reduced, but viscous drag is still sufficient to advance the fibre along a considerable length of duct quite rapidly—for example in one experiment, a fibre passed through 275 meters of reeled duct in 5½ minutes.

It will be appreciated from a reading of EP 0108590 that the viscous drag of air may be used to advance optical fibre members considerable distances along ducts, eg tens to several hundreds of meters. The viscous drag force on the fibre members is distributed along the full length of the members, thereby enabling the members to be advanced over routes with many bends. Prior art dragging methods applied high tension to the fibre member in order to pull them through ducts, and the force applied increased dramatically if the route included curves or bends. The method provides a speedy installation method which does not put undue strain on the fibre member, hence the appreciation in this invention that primary coated fibres may be installed in this manner. Another characterising feature of the blowing process here and in EP 0108590 is that the compressed air, or other fluid medium used to advance the fibre, has a substantially higher velocity than the fibre throughout the length of the duct.

The apparatus may easily be adapted to provide for installation of several fibres simultaneously. For example, four fibres may be fed from their respective reels through individual bores or tubes into chamber 17, and duct 25. The supply of compressed air advances all four fibres together through duct 29.

It will be seen that the apparatus described above differs from that in EP 0287225 in not venting compressed air at any point along the installation route. In the illustrated embodiment of our earlier application, venting occurred some distance downstream of the air inlet, between about 0.3 to 3.0 meters away, causing a drop in pressure before the fibre member passed into the installation passageway. The apparatus described here has a number of advantages, including the fact that substantially all the compressed air supplied is used for advancement (apart from the small fraction leaking through the hypodermic), and there is therefore greater efficiency in the use of compressed air.

Various changes to the details of the product or process may be made. For example, the configuration of the chamber is unimportant: there simply needs to be a way of supplying fibre to the feed duct together with compressed air. In the above embodiment, the chamber was provided by a standard 'T' piece. This is sufficiently cheap to enable the piece to be left in situ after installation if desired. It also enables very straightforward connection and disconnection of the air supply.

Also, the lengths and dimensions of the two portions of duct may vary. The length x of the feed duct may be selected as convenient, eg a few millimeters up to several meters, but more usually in the range 50 cm to 2.5 meters. Rather than have a feed duct (25) extending within the main duct (29), the main duct may be connected to the end of the feed duct remote from the chamber. Alternatively a constriction may be formed in the main duct, fairly close to the entry point of the fibre. The constriction, as does the feed duct, forms an area of high flow velocity, with subsequent expansion of air in a larger diameter region, creating a jet effect. To initiate the process, the fibre is pushed into the smaller diameter region, or constriction, and the supply of compressed air is commenced.

The diameters and relative diameters of the main duct and feed duct may be varied. Ideally, the ratio of inner diameters is in the range 0.1 to 0.8 for feed to main ducts. The feed duct diameter may be as small as 0.5 mm as in the above example, or up to around 2.5 mm. The inner diameter of the main duct may similarly be in the range 3 mm to 8 mm. The various dimensions depend on the desired blowing distance and the nature of the product to be installed (light single fibre or more bulky fibre bundle, for example).

The inner diameter of duct 25 may be increased if there are several fibres to be installed, or fibre bundles of some kind, or decreased if there is only one or a small number of fibres. The diameter of the main duct 29 is adjusted accordingly, to preserve the ratio of internal diameters of the feed to the main duct within a desired range, eg 0.1 to 0.8. For instance, when blowing a fibre bundle of 2 mm diameter, a feed duct diameter of 2.5 mm would be suitable. Desirable diameters can easily be determined by experimentation on the particular combination of products to be used.

As indicated above, one particular advantage of this method is that it may be used for installing primary coated fibres, which have not been further processed by sheathing. However, the method can be used, if desired, to install sheathed fibres or bundles of fibres, or indeed, other kinds of transmission lines, eg copper wire members.

It should be noted that the use of a motor to drive the reel of fibre in the above example is used as an aid in overcoming the friction of the drum, and there is no significant force transmitted to the fibre by the motor drive to advance it along the duct, and advancement is achieved by the viscous drag force of air supplied via inlet 21. A motor may not be necessary if the drum is mounted with low friction bearings. Alternatively, fibre may be torsionally stored on a reel and wound off the reel, with minimum back tension, simply by the air pressure forces acting in the duct. Another option is to use loose coils of fibre (eg figure of eight storage).

As indicated above, the method of the invention can be used for installing individual fibres, or groups of fibres. For example, two or more primary coated fibres can be installed simultaneously. Also, light bundles of several fibres can be installed—for example, the present applicants have used a bundle of two fibres in an acrylic coat, provided with a rip cord which enables the outer coat to be stripped easily to reveal the individual fibres.

The apparatus can easily be connected directly to a break-out assembly. A length of fibre bundle extending from the inlet arm of the chamber (suitably a T-piece as described above) is cut to length, and the rip cord used to strip the outer coat. A tube break-out assembly can than be threaded over the fibres and plugged into the end of the 'T' piece. An injection of resin is used to lock the fibres in place. If it is later desired, for example, to renew or adjust the fibres, the existing 'T' piece and break-out assembly are removed and replaced.

Further, it is possible to blow fibres or fibre members long distances along a duct by providing a series of blowing stages spaced some hundreds of meters (eg 500 meters) apart along the duct. FIG. 2 shows suitable apparatus for such serial, or tandem, blowing. At the upstream end of the duct 29, air inlet (21) is connected to a T-piece 17, as described above. 500 meters downstream, a further T-piece 17' is provided connected to both the first 500 meter length of duct 29 and the next 500 meter length 29'. Each T-piece has a length of small diameter tubing 25, 25' directed into the downstream portion of duct. At the upstream end of T-piece 17' is a vent 31. The reason for this is that a vent has been found necessary to avoid problems with the air flow by allowing air from the first section of duct, 29, to leak away prior to injection of further compressed air via inlet 21', in order to achieve the required pressure gradient for fibre advancement through duct 29. It will be noted that, in contrast to prior art methods, the only vent is provided immediately upstream of the air inlet—eg within 2 to 50 cm of air inlet, at each of the second and subsequent blowing stations.

A hypodermic needle 19' is provided downstream of vent 31. This is connected within 'T' piece 17', so as to present an indented conical surface to the oncoming fibre, to guide it into the needle 19'.

The air supply to inlet 21' can be connected once the fibre member is observed to have been carried through the first portion of duct up to T-piece 17'. Alternatively, a sensor (not shown) can be provided to detect the arrival of the fibre member, for automatic switching on of the air supply. The sensor may, for example, be a pressure sensor which detects a change in flow in the vicinity of T-piece 17'. Provided enough sources of air supply are available, installation can occur automatically along many hundreds of meters of duct. Fibre is blown through one length after another, by providing a number of blowing stations, each comprising a T-piece, feed tube and source of air supply. As the T-piece and feed tube are inexpensive parts, they can be left in situ after the installation.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

We claim:

1. Apparatus for advancing a transmission line along a duct with viscous drag of a fluid medium, comprising an inlet chamber connectable to a fluid source and a duct with a small diameter feed portion close to the chamber, so that a transmission line introduced to the feed portion via the chamber can be advanced through the feed portion and introduced into a larger diameter portion of the duct by virtue of the flow of said fluid through the feed portion from said chamber into said larger diameter portion, which larger diameter portion of duct is, during advancement of the transmission line, stationary with respect to the feed portion.

2. Apparatus for use in situ for advancing a transmission line along a previously-installed duct with viscous drag of a fluid medium, comprising an inlet chamber connectable to a fluid source, and a duct with a small diameter feed portion close to the chamber so that a transmission line introduced to the feed portion via the chamber can be advanced through the feed portion and introduced into a larger diameter portion of the previously-installed duct by virtue of the flow of said fluid through said feed portion and without the use of mechanical drive means to advance the transmission line within the feed portion.

3. Apparatus as claimed in claim 1, wherein the feed portion is between 0.3 and 3.0 meters long.

4. Apparatus as claimed in claim 1, comprising two or more portions of duct, and one or more intermediate stations between the or each pair of portions, said stations comprising a chamber connected to the two portions, an air inlet and a small diameter feed portion.

5. Apparatus for advancing a transmission line along a duct with viscous drag of a fluid medium, comprising an inlet chamber and a duct with a small diameter feed portion close to the chamber, the inlet chamber having a transmission line inlet and a fluid inlet for connection to a fluid source, so that the transmission line introduced to the feed portion via the chamber can be advanced through the feed portion and introduced into a larger diameter portion of the duct by virtue of the flow of said fluid through the feed portion from said chamber into said larger diameter portion, the escape of fluid medium from said larger diameter portion of duct being precluded by the absence of effective vents, the larger diameter portion of duct being stationary with respect to the feed portion during advancement of the transmission line.

6. Apparatus for advancing a transmission line along a duct with viscous drag of a fluid medium, comprising an inlet chamber, the inlet chamber having a fluid inlet for connection to a fluid source, and a transmission line inlet, the transmission line inlet having a smaller cross sectional area than the fluid inlet, and a duct with a small diameter feed portion close to the chamber, so that a transmission line introduced to the feed portion through the transmission line inlet and via the chamber can be advanced through the feed portion and introduced into a large diameter portion of the duct by virtue of the flow of said fluid through the feed portion from said chamber into said larger diameter portion, wherein, in use, some of the fluid introduced into said chamber via said fluid inlet escapes from the chamber via the transmission line inlet.

* * * * *